United States Patent
Kissich et al.

(10) Patent No.: US 6,788,014 B2
(45) Date of Patent: Sep. 7, 2004

(54) DRIVE CONTROL SYSTEM FOR A MULTIPHASE MOTOR POWERED BY A POWER CONVERTER

(75) Inventors: Gerwin Kissich, Erlangen (DE); Hans Seidner, Nürnberg (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 10/246,797

(22) Filed: Sep. 18, 2002

(65) Prior Publication Data

US 2003/0057906 A1 Mar. 27, 2003

(30) Foreign Application Priority Data

Sep. 21, 2001 (DE) .......................... 101 46 523

(51) Int. Cl.⁷ .............................. H02P 7/00; H02K 17/32
(52) U.S. Cl. ...................... 318/434; 318/362; 318/375; 318/439; 388/903
(58) Field of Search ........................ 318/375–380, 318/86, 757, 798, 805, 806, 254, 439, 432, 434, 138, 139, 4.39, 727, 811, 599, 800; 388/903

(56) References Cited

U.S. PATENT DOCUMENTS

| | | | |
|---|---|---|---|
| 5,569,966 A | * | 10/1996 | Schantz et al. ............ 307/10.1 |
| 5,747,955 A | * | 5/1998 | Rotunda et al. ............ 318/434 |
| 6,043,999 A | * | 3/2000 | Ehrenberg et al. ............ 363/89 |
| 6,359,794 B1 | * | 3/2002 | Real ............................ 363/17 |

FOREIGN PATENT DOCUMENTS

EP     0 742 637     11/1996

* cited by examiner

*Primary Examiner*—David Martin
*Assistant Examiner*—Renata McCloud
(74) *Attorney, Agent, or Firm*—Henry M. Feiereisen

(57) ABSTRACT

A drive control system for a multiphase motor powered by a power converter of a type including a multi-pulsed bridge circuit with a plurality of controllable converter valves and a same number of electrically isolating devices, includes a control unit, with the input side of the converter valves connected to the output side of the control unit via the electrically isolating devices, and an armature short-circuit braking device for connection to the input side of electrically isolating devices of one bridge side of the bridge circuit. An overvoltage recognition device is provided to receive a signal commensurate with a limit value, and a signal commensurate with a determined actual input voltage of the power converter. A trigger circuit is connected to the armature short-circuit braking device, and has an input connected to an output of the overvoltage recognition device and supplied with a signal for the armature short-circuit braking device.

12 Claims, 3 Drawing Sheets

DRIVE CONTROL SYSTEM FOR A MULTIPHASE MOTOR POWERED BY A POWER CONVERTER

CROSS-REFERENCES TO RELATED APPLICATIONS

This application claims the priority of German Patent Application, Serial No. 101 46 523.8, filed Sep. 21, 2001, pursuant to 35 U.S.C. 119(a)–(d), the subject matter of which is incorporated herein by reference.

BACKGROUND OF THE INVENTION

The present invention relates, in general, to a drive control system for a multiphase motor powered by a power converter.

Drives for high velocities or rotation speeds are increasingly in commercial use. This is true in particular for the power tool industry. Although rotation speeds of up to 20,000 rpm have already been employed and proven reliable, there is a need for rotation speeds in excess of 20,000 rpm. In particular, when high speeds are involved, motors feed back energy into the system. This is normally realized by a power converter on the mains systems side to feed energy back to the power supply. In case of trouble or a power outage, this energy cannot be fed back, resulting, especially in cases when motors are involved that rotate at high rpm, in significant overvoltages in the voltage intermediate circuit of a converter, which is connected before the motor, and may ultimately lead to the destruction of the converter.

To address this problem, the incorporation of a module has been proposed to reduce encountered overvoltage. A module of the type concerned here is illustrated in FIG. 1 and designated by reference numeral 2. The module 2, also called voltage-protection module (VPM), is placed between the input side of a multiphase motor 4 and the output side of a power converter 6 of a converter 8. In addition, the module 2 is connected via a control line 10 to the output side of a drive control system 12 of the motor-side power converter 6. The converter 8 includes a voltage intermediate circuit to electrically connect on the DC voltage side the power converter 6 on the motor side and a power converter 14 on the mains systems side. For sake of simplicity, the voltage intermediate circuit is not shown in detail. The power converter 14 on the mains systems side is implemented as a converter that is capable to feed back electric energy so as to enable a return of energy into the power mains supply 16 during braking action of the motor 4.

An overvoltage-monitoring device checks whether a determined actual voltage value of the voltage intermediate circuit of the converter 8 exceeds a predetermined limit value. As soon as an unacceptable overvoltage is occurs, module 2 is activated and drive control system 12 transmits control signals via the control line 10. The module 2 has incorporated therein a connection of at least several controllable power semiconductor switches, which can be switched off or disabled and are so controlled and switched together as to short the motor lines that are electrically connected via an electric path through the module 2. Optionally, the module 2 may also include resistors so that the electric loss power does not occur solely across the power semiconductor switches.

The provision of such a module 2 suffers shortcomings because the module 2 requires space which is approximately the same as the space needed for the motor-side power converter 6. Moreover, the module 2 has to be connected on the power supply side with the output side of the motor-side power converter 6 and the input side of the multiphase motor 2, and on the control side with the output side of the drive control system 12 of the power converter 6. This may lead to circuit failure.

A drive control system 12 of a type involved here is disclosed in European Patent Publication 0 742 637 and shown in more detail in FIG. 2. The multiphase motor 4 is connected in an electrically conductive manner with phase outputs L1, L2, L3 of the motor-side power converter 6. The power converter 6 includes six valve arms in the form of controllable converter valves or power semiconductor switches T1, T2, T3, T4, T5, T6, which can be switched off or disabled, whereby the power semiconductor switches T1, T3, T5 are arranged in the upper bridge side and the power semiconductor switches T2, T4, T6 are arranged in the lower bridge side. The power semiconductor switches T1, T2, T3, T4, T5, T6, are configured as insulated gate bipolar transistors (IGBT). Power semiconductor switches T1 and T2 of the upper and lower bridge sides of the power converter 6 form a bridge arm as do power semiconductor switches T3 and T4, and power semiconductor switches T5 and T6, and are connected between a positive busbar +Ud and a negative busbar –Ud of a voltage intermediate circuit, not shown in detail. The power semiconductor switches T1, T2, T3, T4, T5, T6 are each controlled by a electrically isolating device 18, of which only two are shown for ease of illustration. An example of such an electrically isolating device 18 includes optocoupler. By means of the electrically isolating devices 18, the power converter 6 (power component) is connected to the drive control system 12 (control component).

The drive control system 12 includes a control unit 20, e.g. a pulse width modulator, for providing signals to address the optocouplers 18 and thus to effect a switching of the semiconductor switches T1, T2, T3, T4, T5, T6 of the power converter 6. The signals are sent by the control unit 20 through three signal lines 17 for the upper bridge side and three signal lines 19 for the lower bridge side, whereby the signal lines 17, 19 include each a diode and a resistor in series. FIG. 2 illustrates, by way of example, the control for the two optocouplers 18, shown here. The drive control system 12 further includes a pulse suppressor 22 for cutting the energy supply to the electric drive by suppressing the pulses on the motor-side power converter 6. The pulse suppressor 22 is activated by a signal S1 and includes a further optocoupler for indicating the status of the pulse suppressor by means of a status signal $S_{AKB}$ which is sent to the control unit 20, on the one hand, as well as to a device 24 for braking by armature short-circuiting, referred to as "armature short-circuit braking device" in the following description.

In the event of a fault, one of both bridge sides is blocked securely, while the other bridge side is switched on through timed control of the power semiconductor switches T2, T4, T6 so that at least two phases of the multiphase motor 4 are shorted. Of course, it is equally possible to block the lower bridge side and to provide a timed control of the upper bridge side of the power converter 6. In order to implement the required emergency braking in the event of a fault, the armature short-circuit braking device 24 now switches through all transistors T2, T4, T6 of the lower bridge side so that the three phases of the electric motor 4 are shorted across the negative busbar –Ud. The remaining kinetic energy of the multiphase motor 4 drives the braking current across the thus-realized shorted bridge. Through the timed control by means of a clock frequency, the power semiconductor switches T2, T4, T6 of the lower bridge side of the power converter 6 can be switched through in such a tailored manner that the braking moment generated by the short circuit can be appropriately varied. The armature short-circuit braking device 24 is intended for use solely in emergency situations to shut down the motor as quickly as possible.

It would therefore be desirable and advantageous to provide an improved drive control system, which obviates prior art shortcomings and is so configured as to omit the need for an external voltage-protection module.

SUMMARY OF THE INVENTION

According to one aspect of the present invention, a drive control system for a multiphase motor powered by a power converter of a type including a multi-pulsed bridge circuit with a plurality of controllable converter valves, which have an input side, and a plurality of electrically isolating devices in one-to-one correspondence with the converter valves, includes a control unit having an output side, wherein the input side of the converter valves is connected to the output side of the control unit via the electrically isolating devices; an armature short-circuit braking device constructed for connection with the input side of electrically isolating devices of one bridge side of the bridge circuit, an overvoltage recognition device having a first input terminal which receives a signal commensurate with a limit value, and a second input terminal which receives a signal commensurate with a determined actual input voltage of the power converter; and a trigger circuit having an output side which is connected to the armature short-circuit braking device, and an input side which is connected to an output side of the overvoltage recognition device and supplied with a signal for the armature short-circuit braking device.

The present invention resolves prior art problems by providing the drive control system with an overvoltage recognition device and a trigger circuit, whereby the trigger circuit links logically the output signal of the overvoltage recognition device with a trigger signal for the armature short-circuit braking device, so that the armature short-circuit braking device can be utilized also for drop of an overvoltage in the voltage intermediate circuit of the converter. A converter configured in this way contributes to a decrease in the number of components so that the overall drive system becomes more cost-efficient and reliable. Moreover, the need for assembly of an additional voltage-protection module is eliminated. In order to exploit the already existing armature short-circuit braking device for use as overvoltage protection in addition to the use as emergency shutoff, it is only necessary to incorporate the overvoltage recognition device and the trigger circuit. Thus, the operation of a voltage-protection module can be integrated with minimum expenditure in the drive control system of a converter.

According to another feature of the present invention, the overvoltage recognition device may be a comparator.

According to another feature of the present invention, the trigger circuit may be an OR gate.

According to another feature of the present invention, the control unit may be a pulse width modulator.

According to another feature of the present invention, the electrically isolating units may be an optocoupler.

According to another feature of the present invention, the converter valves may be insulated-gate bipolar transistors.

According to another feature of the present invention, the multiphase motor may *be a three-phase motor.

According to another feature of the present invention, the drive control system may be constructed in the form of a microcontroller.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
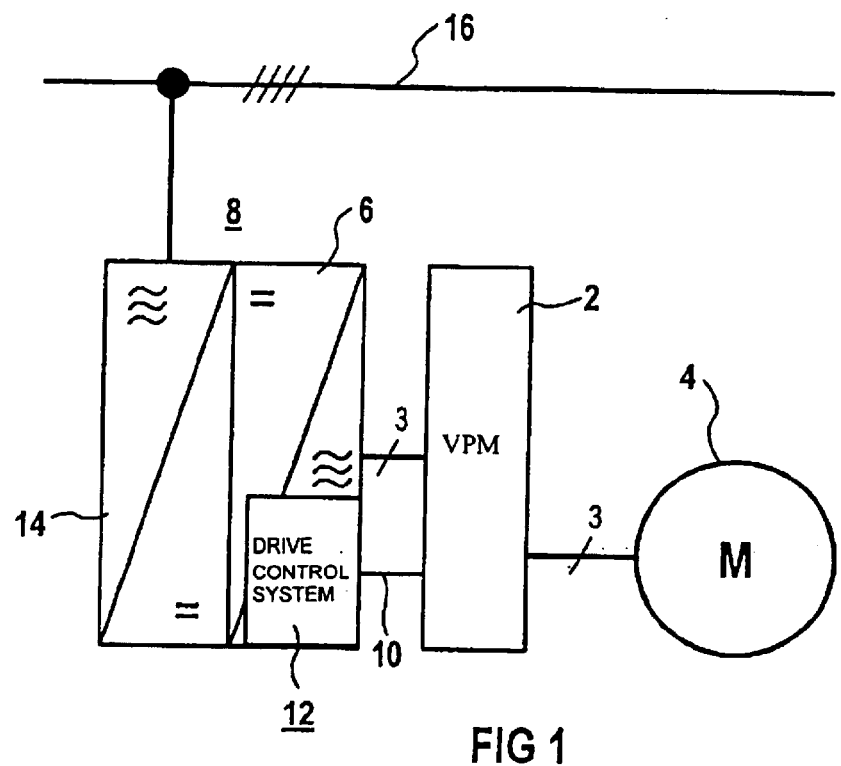
FIG. 1 is a principal illustration of a conventional block diagram for implementing an overvoltage protection.
Figure 3:
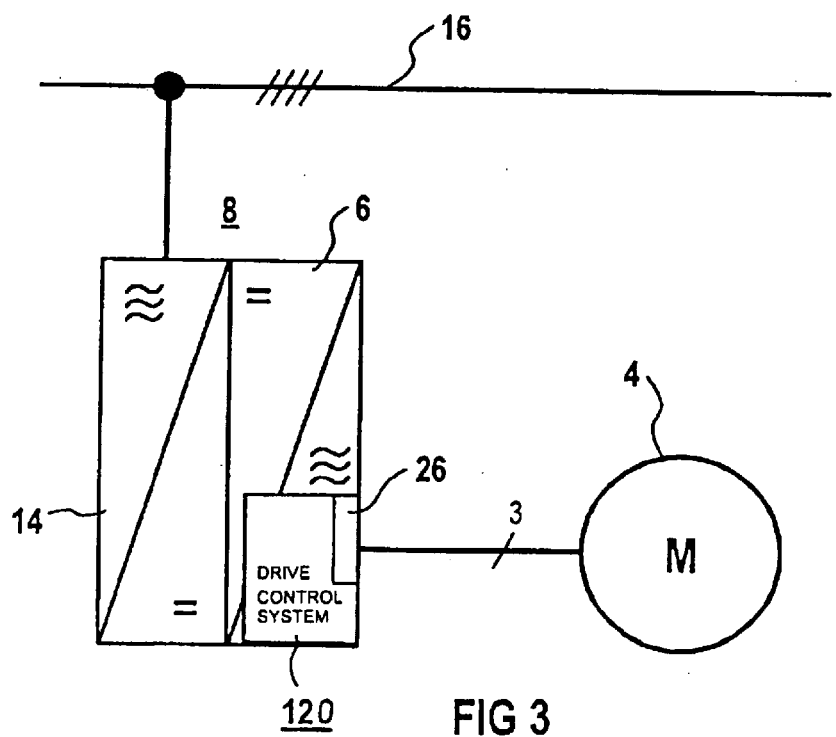
FIG. 3 is a principal illustration of a block diagram for implementing an overvoltage protection in accordance with the present invention.
Figure 2:
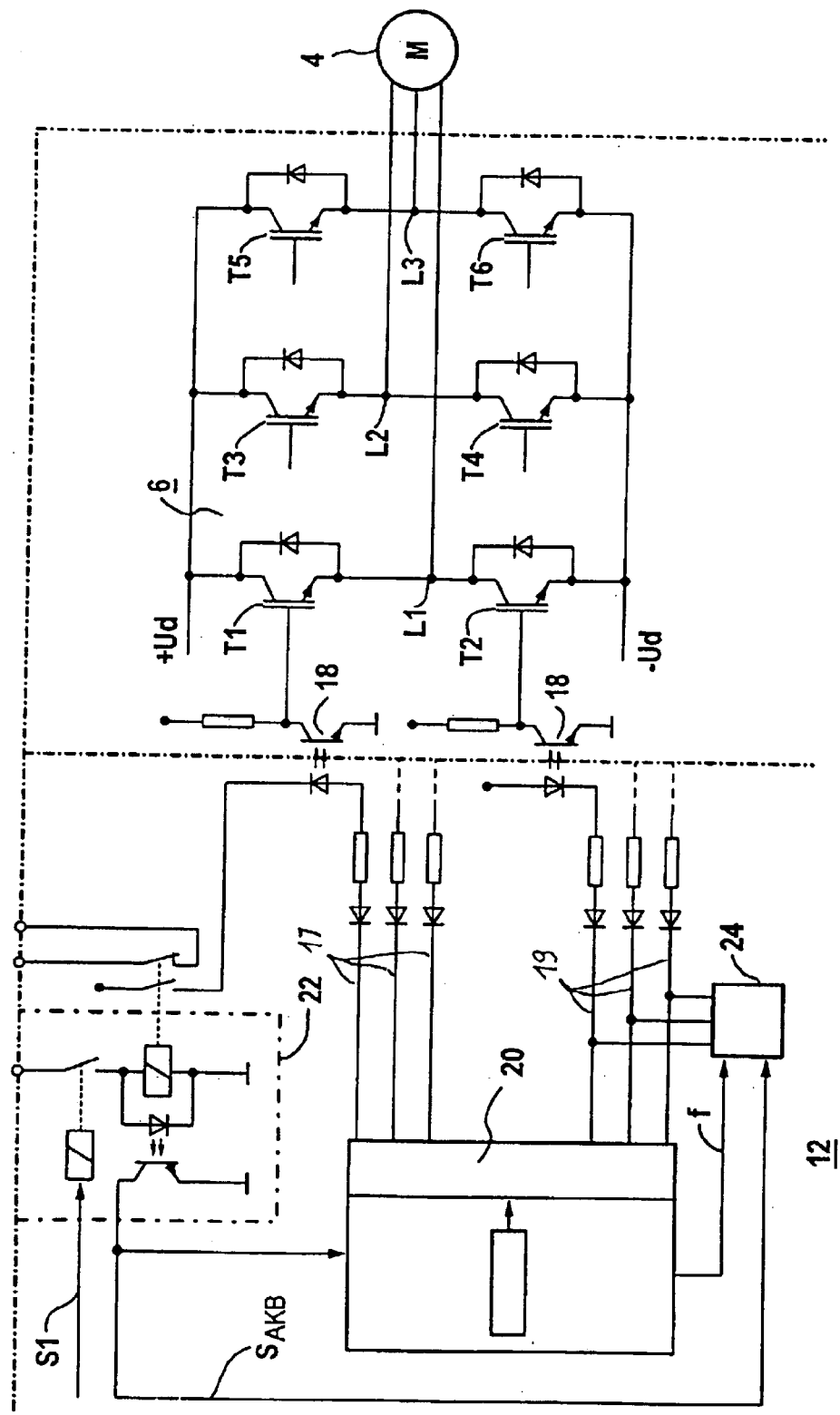
FIG. 2 is a schematic illustration of a conventional drive control system for a power converter with armature short-circuit for emergency braking.

Turning now to the drawing, and in particular to FIG. 3, there is shown a principal illustration for implementing an overvoltage protection in accordance with the present invention. Parts corresponding with those in FIG. 1 are denoted by identical reference numerals and not explained again. In accordance with the present invention, provision is made for a voltage intermediate circuit of a converter 8 with a drive control system 120 which has incorporated therein a supplemental voltage protection device 26, also called VP-supplemental device and illustrated in more detail in FIG. 4, and an armature short-circuit braking device 24. The supplemental voltage protection device 26 enables the exploitation of the armature short-circuit braking device 24 to reduce an overvoltage in the voltage intermediate circuit of the converter 8 in addition to the function of realizing an emergency braking in the event of a failure. Thus, in accordance with the present invention, the supplemental voltage protection device 26 eliminates the need for a separate external voltage-protection module according to FIG. 1. As a consequence of the absence of such a separate voltage-protection module, the need for a respective installation for this part is eliminated so that the converter 8 requires overall less space and the drive system becomes more reliable and cost-efficient.

Although only one signal line 17 is shown between the control unit 20 and the optocouplers 18 of the upper bridge side and only one signal line 19 between the control unit 20 and the optocouplers 18 of the lower bridge side, as well as only one signal line 21 between the short-circuit braking device 24 and the optocouplers 18 of the lower bridge side is shown, it will be understood by persons skilled in the art that in fact three lines are present here in each case, as also indicated schematically in FIGS. 1 and 3 by numeral 3.

Figure 4:
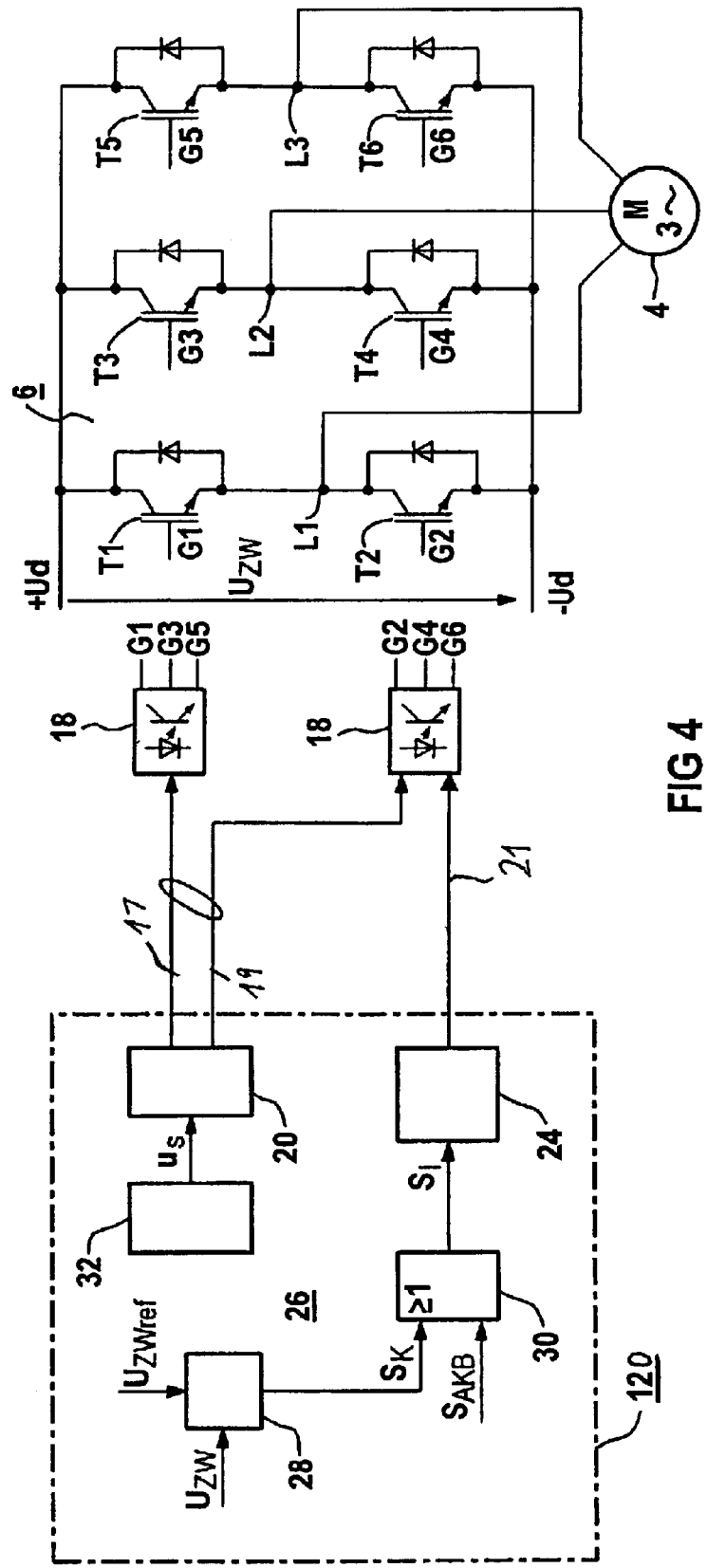
FIG. 4 is a schematic illustration of a circuit for realizing a drive control system according to the present invention.

Turning now to FIG. 4, there is shown a schematic illustration of a circuit for realizing the drive control system 120 in accordance with the present invention. The supplemental voltage protection device 26 of the drive control system 120 includes an overvoltage recognition device 28, e.g. a comparator, and a trigger circuit, e.g. logic gate, especially an OR gate. The drive control system 120 further includes a control unit 20 and a regulator 32, which generates a manipulated variable $u_s$ in dependence on one or more desired values, which, for ease of illustration, are not shown in detail. The manipulated variable $u_s$ is transmitted to the control unit 20, e.g. a pulse width modulator, to produce control signals 3 for the motor-side power converter 6. The regulator 32 may be realized as a conventional field-oriented control.

The drive control system 120 is electrically isolated by the optocouplers 18 from the input terminals G1 to G6 of the controllable converter valves T1 to T6 of the power converter 6. Again, for ease of illustration, only two of the six optocouplers 18 are shown in more detail in FIG. 4.

The armature short-circuit braking device 24, already provided to effect the emergency shutdown in dependence on the generated status signal $S_{AKB}$, is connected by line 21 to the power converter 6 in an electrically isolated manner by means of the optocouplers 18 of the converter valves T2, T4, T6 of the lower bridge side of the power converter 6.

In accordance with the present invention, the supplemental voltage protection device 26 is connected before the armature short-circuit braking device 24, whereby the produced status signal $S_{AKB}$ is transmitted to a first input terminal of the trigger circuit 30. A second input terminal of the trigger circuit 30 is operatively connected with the output side of the overvoltage recognition device 28. One input terminal of the overvoltage recognition device 28 receives a determined actual voltage value $U_{ZW}$ of the voltage intermediate circuit of the converter 8. Another input terminal of the overvoltage recognition device 28 receives a predetermined limit value $U_{Zwref}$. As soon as the determined actual voltage value $U_{ZW}$, which is also used by the control unit 20, exceeds the predetermined limit value $U_{Zwref}$, a signal $S_K$ is produced at the output of the overvoltage recognition device 28. In the event that one of the signals $S_K$ and $S_{AKB}$ at the trigger circuit 30 (OR gate) or both change its/their output potential from logic zero to logic one, the trigger circuit 30 generates a trigger signal $S_f$, thereby activating the armature short-circuit braking device 24, i.e. the converter valves T2, T4, T6 of the power converter are either switched on permanently or in timed periods. The converter valves T1, T3, T5 are blocked so that the bridge can no longer be short-circuited. Of course, instead of control of the converter valves T2, T4, T6, the armature short-circuit braking device 24 may also control the converter valves T1, T3, T5, so that the converter valves T2, T4, T6 are then blocked.

The drive control system 12 in accordance with the present invention for an inverter 8 enables the use of the already existing armature short-circuit braking device 24 for a decrease of the overvoltage in the voltage intermediate circuit of the converter 8 in addition to the realization of an armature shorting for braking operation. As a consequence, the need for a voltage-protection module 2 is eliminated.

The drive control system 12 in accordance with the present invention for an converter 8 enables the use of the already existing armature short-circuit braking device 24 for a decrease of the overvoltage in the voltage intermediate circuit of the converter 8 in addition to the realization of an armature shorting for braking operation. As a consequence, the need for a voltage-protection module 2 is eliminated.

What is claimed as new and desired to be protected by Letters Patent is set forth in the appended claims and their equivalents:

What is claimed is:

1. A drive control system for a multiphase motor powered by a power converter of a type including a multi-pulsed bridge circuit with a plurality of controllable converter valves which have an input side, and a plurality of electrically isolating devices in one-to-one correspondence with the controllable converter valves, said drive control system comprising:

a control unit having an output side, wherein the input side of the converter valves is connected to the output side of the control unit via the electrically isolating devices;

an armature short-circuit braking device connected to an input side of electrically isolating devices of one bridge side of the bridge circuit; and over voltage recognition device having a first input terminal which receives a signal corresponding to a limit value and a second input terminal which receives a signal corresponding to a determined actual input voltage of the power converter; and a trigger circuit having an output side which is connected to the armature short-circuit braking device, and an input side which is connected to an output side of the overvoltage recognition device and supplied with a signal for the armature short-circuit braking device.

2. The control device of claim 1, wherein the overvoltage recognition device is a comparator.

3. The control device of claim 1, wherein the trigger circuit is an OR gate.

4. The control device of claim 1, wherein the control unit is a pulse width modulator.

5. The control device of claim 1, wherein the electrically isolating devices are each an optocoupler.

6. The control device of claim 1, wherein the converter valves are insulated-gate bipolar transistors.

7. The control device of claim 1, wherein the multiphase motor is a three-phase motor.

8. The control device of claim 1 in the form of a microcontroller.

9. A power converter circuit for providing electric energy to a multiphase motor, comprising:

a first plurality of controllable converter valves connected to a positive busbar of a multi-pulsed bridge circuit and a second plurality of controllable converter valves connected to a negative busbar of the bridge circuit;

a plurality of electrically isolating devices connected to the converter valves in one-to-one correspondence; and a drive control system including a control unit having an output side connected to an input side of the converter valves via the electrically isolating devices;

an armature short-circuit braking device connected to an input side of electrically isolating devices of one bridge side of the bridge circuit; and over voltage recognition device having a first input terminal which receives a signal corresponding to a limit value and a second input terminal which receives a signal corresponding to a determined actual input voltage of the power converter; and a trigger circuit having an output side which is connected to the armature short-circuit braking device, and an input side which is connected to an output side of the overvoltage recognition device and supplied with a signal for the armature short-circuit braking device.

10. A method for providing a combined motor braking operation and overvoltage protection of a converter of a type including a multi-pulsed bridge circuit with a plurality of controllable converter valves, comprising the steps of:

transmitting a status signal to a trigger circuit, the status signal corresponding to a status of an impulse suppression device;

comparing an actual voltage value in a voltage intermediate circuit of a converter with a predetermined limit value to generate an output signal for input into the trigger circuit; and logically interlinking the output signal and the status signal by the trigger circuit to activate an armature short-circuit braking device, when at least one of the output signal and status signal changes its output potential to thereby effect an armature short-circuit by shorting converter valves of one bridge side of the bridge circuit while disabling converter valves of another bridge side of the bridge circuit.

11. The method of claim 10, wherein the output signal changes the output potential, when the actual voltage value exceeds the predetermined limit value.

12. The method of claim 10, wherein the converter valves of the one bridge side are switched on permanently or in timed periods.

* * * * *